(12) United States Patent
Hwang

(10) Patent No.: US 11,345,321 B2
(45) Date of Patent: May 31, 2022

(54) PARKING LEVER SWITCH AND OPERATING METHOD THEREOF

(71) Applicants: HYUNDAI MOTOR COMPANY, Seoul (KR); KIA MOTORS CORPORATION, Seoul (KR)

(72) Inventor: Won-Jun Hwang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 373 days.

(21) Appl. No.: 16/654,869

(22) Filed: Oct. 16, 2019

(65) Prior Publication Data

US 2020/0156600 A1  May 21, 2020

(30) Foreign Application Priority Data

Nov. 19, 2018  (KR) .......................... 10-2018-0142839

(51) Int. Cl.
*F16D 65/14* (2006.01)
*B60T 7/10* (2006.01)

(52) U.S. Cl.
CPC .................................... *B60T 7/102* (2013.01)

(58) Field of Classification Search
CPC ............. F16D 2125/60; F16D 2125/62; F16D 2125/64; B60T 7/102; B60T 11/046; H01H 3/16; H01H 17/12; H01H 17/16; H01H 17/18; H01H 17/20; H01H 17/22; H01H 17/24
See application file for complete search history.

(56) References Cited

U.S. PATENT DOCUMENTS

| 3,591,748 | A | * | 7/1971 | Holden | ................ H01H 17/165 200/546 |
| 8,471,160 | B1 | * | 6/2013 | Beugelsdyk | ............. H01H 3/16 200/250 |
| 2008/0078632 | A1 | * | 4/2008 | Mears | ................... B60T 11/046 188/204 R |
| 2018/0162262 | A1 | * | 6/2018 | Kim | ....................... B60Q 1/441 |

FOREIGN PATENT DOCUMENTS

KR   19980053408 A   9/1998

* cited by examiner

*Primary Examiner* — Nicholas J Lane
(74) *Attorney, Agent, or Firm* — Lempia Summerfield Katz LLC

(57) ABSTRACT

A parking lever switch may include a spring supporter; a switch input and output terminal, which can contact the spring supporter; an elastic spring supporting the spring supporter; a cable rod connected with the spring supporter; and a cable guide that guides the cable rod. The switch is energized when the force applied to the spring supporter connected with the cable rod is equal to or greater than the value obtained by multiplying a spring constant k of the elastic spring by a displacement.

15 Claims, 4 Drawing Sheets

PARKING LEVER SWITCH AND OPERATING METHOD THEREOF

CROSS-REFERENCE(S) TO RELATED APPLICATIONS

This application claims priority to Korean Patent Application No(s). 10-2018-0142839, filed on Nov. 19, 2018, which is incorporated herein by reference in its entirety.

BACKGROUND OF THE DISCLOSURE

Field of the Disclosure

The present disclosure relates to a parking lever switch and an operating method thereof, and more particularly, the present disclosure relates to a parking lever switch and an operating method thereof capable of confirming whether a parking lever is fastened with a predetermined operating force or more.

Description of the Related Art

In general, a brake system of a vehicle is an important device used to decelerate or stop a traveling vehicle and to maintain a parked state. Such a braking system includes a main brake (foot brake) mainly used while the vehicle is traveling and includes a parking brake used for parking the vehicle when not traveling. The main brake is called a foot brake because the driver manipulates the main brake with their foot. The parking brake is called a hand brake because the driver manipulates the parking brake manually with their hand. A parking lever is a device for operating the parking brake and applying the force of the parking brake.

It is common for the parking brake to have a configuration independent of the main brake. That is, when the parking lever is pulled and pivoted, the parking brake is activated by pulling a cable that is connected with the parking lever, causing a braking force at one or more of the wheel brakes on the vehicle. In addition, a locking means is further included for locking the parking lever in such a state that a braking force is generated and maintained.

On the other hand, in a conventional parking lever switch structure, a stopper fixed to the parking lever turns off the switch when the parking lever is not operated or engaged. When the parking lever is operated to engage the parking brake, the stopper is moved upward together with the parking lever and the switch contacts then contact each other by a spring inside the parking lever switch to turn on the switch. In this way, the parking lever operation lamp is turned on in an instrument cluster.

In other words, the on/off function of the conventional parking lever switch is achieved by a mechanism that is only mechanically turned on and off by the operation of the parking lever, regardless of the operating force of the parking lever. There is a disadvantage in that it cannot be confirmed whether or not the parking lever is fastened or secured with sufficient operating force to stop or hold the vehicle. This poses a safety problem in developing a remote start function of a manual transmission vehicle.

The foregoing is intended merely to aid in the understanding of the background of the present disclosure. The foregoing is not intended to mean that the present disclosure falls within the purview of the related art that is already known to those having ordinary skill in the art.

SUMMARY OF THE DISCLOSURE

An embodiment of the present disclosure provides a parking lever switch and an operating method thereof capable of confirming a state in which a parking lever is fastened, i.e., engaged, secured, or operated, sufficiently to transmit an operating force to a parking cable at a predetermined operating force or more in order to overcome the problems of the related art.

A parking lever switch according to one aspect of the present disclosure may include a spring supporter; a switch input and output terminal that can contact the spring supporter; an elastic spring supporting the spring supporter; a cable rod connected with the spring supporter; and a cable guide that guides the cable rod guide. The parking lever switch is energized when the force applied to the spring supporter connected with the cable rod is equal to or greater than a value obtained by multiplying a spring constant k of the elastic spring by a displacement.

The spring supporter may include a cable rod fixing portion; an elastic spring supporting portion supporting the elastic spring; and an insertion supporting portion of which a part is inserted into and supported by a cable guide rod hole of the cable guide in the elastic spring supporting portion.

The insertion supporting portion may be formed with a wedge shape in the direction of the switch input and output terminal.

The switch input and output terminal may include a switch input and output wiring that outputs a signal.

The switch input and output terminal may be formed with a bent extension portion that can contact the elastic spring supporting portion of the spring supporter.

The elastic spring may provide elasticity between the spring supporter and the switch input and output terminal.

An end portion of the cable rod may be fixed at the spring supporter and another end portion of the cable rod may be connected with an equalizer.

The equalizer may be connected with a parking cable.

The cable guide may be formed with a cable rod guide hole that guides the cable rod.

The cable rod guide hole may be mounted at one side surface of the parking lever.

An operating method of a parking lever switch according to another aspect of the present disclosure may include applying elasticity to a spring supporter connected with a cable rod by an elastic spring before a parking lever switch is operated. The method may include applying a force to the spring supporter connected with the cable rod of the parking lever switch being operated that is equal to or less than a value obtained by multiplying a spring constant k by a displacement. The parking lever switch may then output an OFF signal. The method may include applying added force to the spring supporter connected with the cable rod of the parking lever switch being operated that exceeds the value obtained by multiplying the spring constant k by the displacement.

The parking lever switch may then output an ON signal. The method may include maintaining the added force applied to the spring supporter connected with the cable rod of the parking lever switch being operated that exceeds the value obtained by multiplying the spring constant k by the displacement. The parking lever switch may then maintain outputting the ON signal. The method may include releasing the force applied to the spring supporter connected with the cable rod of the parking lever switch. The parking lever switch may then output the OFF signal.

When the force applied by the parking lever switch being operated is equal to or less than the value obtained by multiplying the spring constant k by the displacement, an elastic spring supporting portion of the spring supporter may not contact a switch input and output terminal.

When the added force applied by the parking lever switch being operated exceeds the value obtained by multiplying the spring constant k by the displacement, an elastic spring supporting portion of the spring supporter may contact a bent extension portion of a switch input and output terminal.

When the added force applied by the parking lever switch is maintained exceeding the value obtained by multiplying the spring constant k by the displacement, an insertion supporting portion of the spring supporter may be supported by a cable guide rod hole of a cable guide.

When the force applied by the parking lever switch is released, the elastic spring may release the connection of the spring supporter and a switch input and output terminal.

The cable rod may be guided along a cable guide rod hole of a cable guide in the operating method.

Therefore, in the parking lever switch and operating method thereof according to an embodiment of the present disclosure, the parking lever switch is able to confirm that the parking lever is transmitting a predetermined operating force or more to the parking cable, thereby improving reliability and safety in developing a remote start function of a manual transmission vehicle.

Further, compared with a conventional electronic switch, the disclosed parking lever switch can reduce the cost and minimize variations, so that information about the parking lever operating force can be output, which can improve the commercial value and merchantability of a vehicle.

In addition, the application of a conventional parking lever in a vehicle does not provide information on the parking lever operating force, so it is not easy to adjust the tension. In accordance with the present disclosure, the parking lever operating force adjustment and timing can be provided, thereby improving the commercial value and merchantability of a vehicle.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF EMBODIMENTS

The embodiments described below are provided so that those having ordinary skill in the art can easily understand the technical idea of the present disclosure, and thus the present disclosure is not limited thereto. In addition, the items represented in the attached drawings are the schematized drawings in order for easily describing the embodiments of the present disclosure and may be different from the forms actually implemented.

When any constituent element is referred to as being connected or contacted with other constituent elements, it should be understood that it may be directly connected or contacted with the other constituent elements but there may be the other constituent elements therebetween.

The term "connection" as used herein includes a direct connection or indirect connection between a member and another member and may mean all physical connections such as adhesion, attachment, fastening, bonding, and coupling.

In addition, expressions such as "first, second", and the like are used only to distinguish among a plurality of configurations, and do not limit the order or other features between configurations.

The singular forms include a plurality of representations unless the context clearly dictates otherwise. The term "comprising" or "having" is intended to mean that there is a feature, number, step, operation, constituent element, component or combination thereof described in the specification, and it may be interpreted that one or more other features, numbers, steps, operations, constituent element, component, or combinations thereof can be added.

Figure 1:
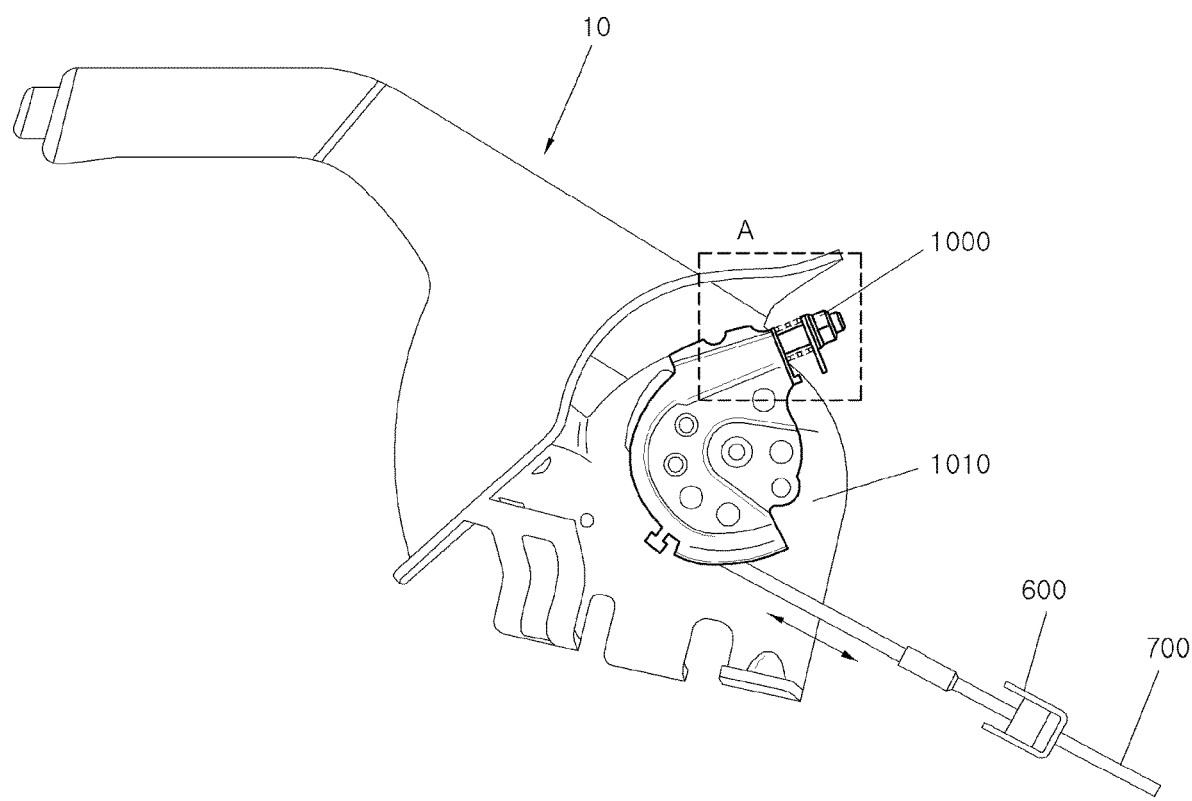
FIG. 1 is a schematic view of a parking lever having a parking lever switch according to an embodiment of the present disclosure.
Figure 2:
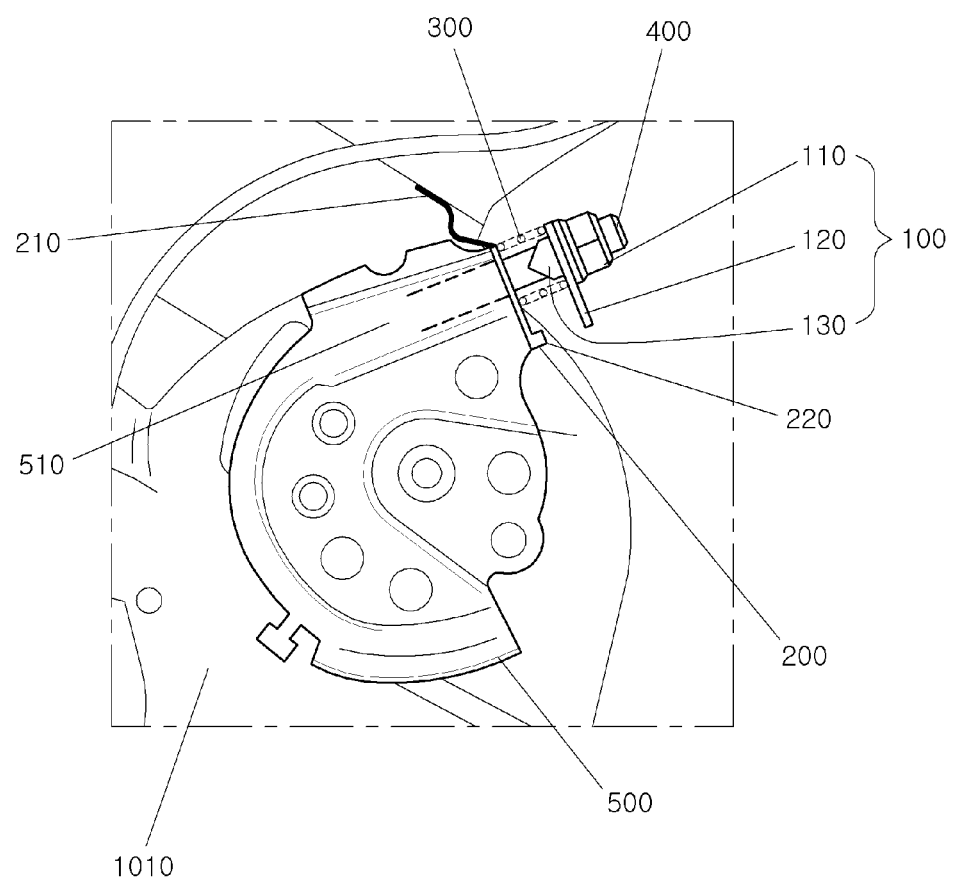
FIG. 2 is a partial enlarged schematic view of a portion "A" shown in FIG. 1.

FIG. 1 is a schematic view of a parking lever including a parking lever switch according to an embodiment of the present disclosure. FIG. 2 is a partial enlarged schematic view of a portion "A" shown in FIG. 1.

Referring to FIGS. 1 and 2, a parking lever 10 includes a parking lever switch 1000 according to an embodiment of the present disclosure. The parking lever switch 1000 may include a spring supporter 100, a switch input and output terminal 200 that contacts the spring supporter 100, an elastic spring 300 that supports the spring supporter 100, a cable rod 400 connected with the spring supporter 100, and a cable guide 500 that guides the cable rod 400. When the force applied to the spring supporter 100, which is connected to the cable rod 400, is equal to or greater than a value obtained by multiplying the spring constant k of the elastic spring 300 by the displacement, the parking lever switch 1000 is configured to be energized.

Herein, the force applied to the spring supporter 100 connected to the cable rod 400 may be a force transmitted from a generated driving torque. The displacement may be a distance that the spring supporter 100 moves and comes into contact with the switch input and output terminal 200.

In this embodiment, the spring supporter 100 is configured to include a cable rod fixing portion 110, an elastic spring supporting portion 120 that supports the elastic spring 300, and an insertion supporting portion 130. A part of the insertion supporting portion 130 is inserted into and supported by a cable guide rod hole 510 of a cable guide 500 in the elastic spring supporting portion 120.

In this configuration, the insertion supporting portion 130 in one example is a wedge shape in the direction of the switch input and output terminal 200.

According to the present disclosure, the switch input and output terminal 200 is configured to include a switch input and output wiring 210 for outputting a signal. A bent extension portion 220 is positioned to contact the elastic spring supporting portion 120 of the spring supporter 100. The bent extension portion 220 may be formed at the opposite or other side of the switch input and output terminal relative to the switch input and output wiring 210.

Herein, the elastic spring 300 may provide electricity between the spring supporter 100 and the switch input and output terminal 200.

On the other hand, an end portion of the cable rod 400 may be fixed to the spring supporter 100. The other end portion of the cable rod 400 may be connected with an equalizer 600 and the equalizer 600 may be connected with a parking cable 700.

The cable rod guide hole 510 for guiding the cable rod 400 may be formed at the cable guide 500 according to the present disclosure. The cable rod guide hole 510 may be mounted at one side surface 1010 of the parking lever 10.

Figure 3:
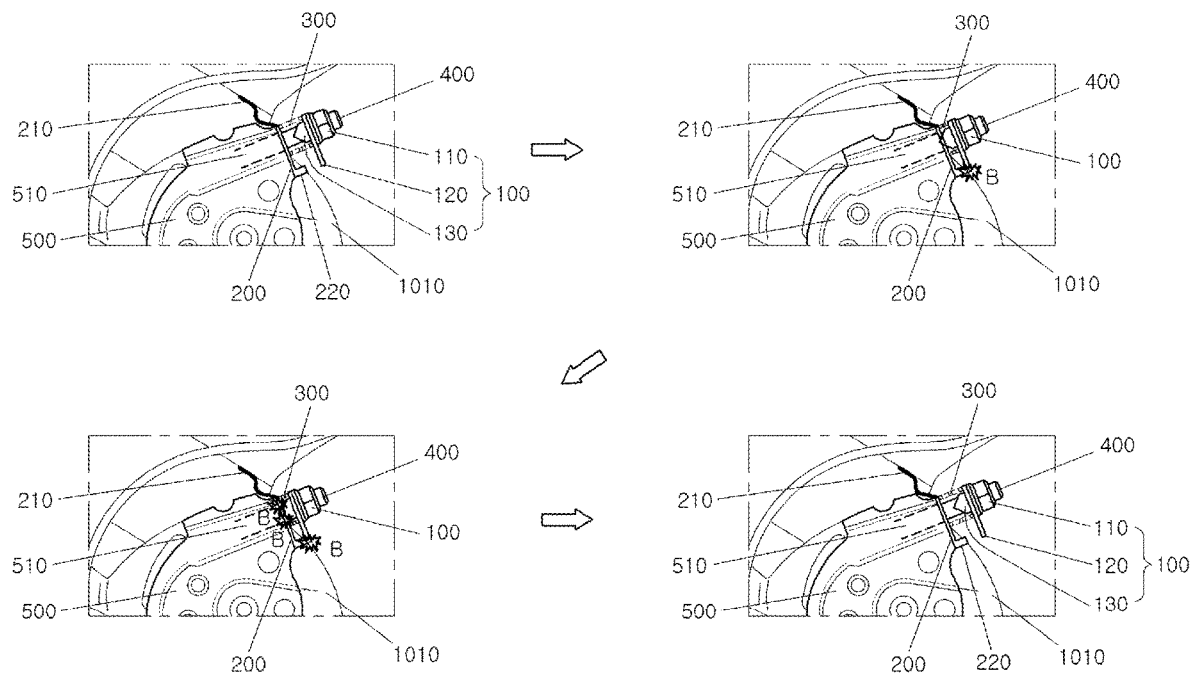
FIG. 3 is a schematic view showing an operation relationship of the parking lever switch according to an embodiment of the present disclosure.
Figure 4:
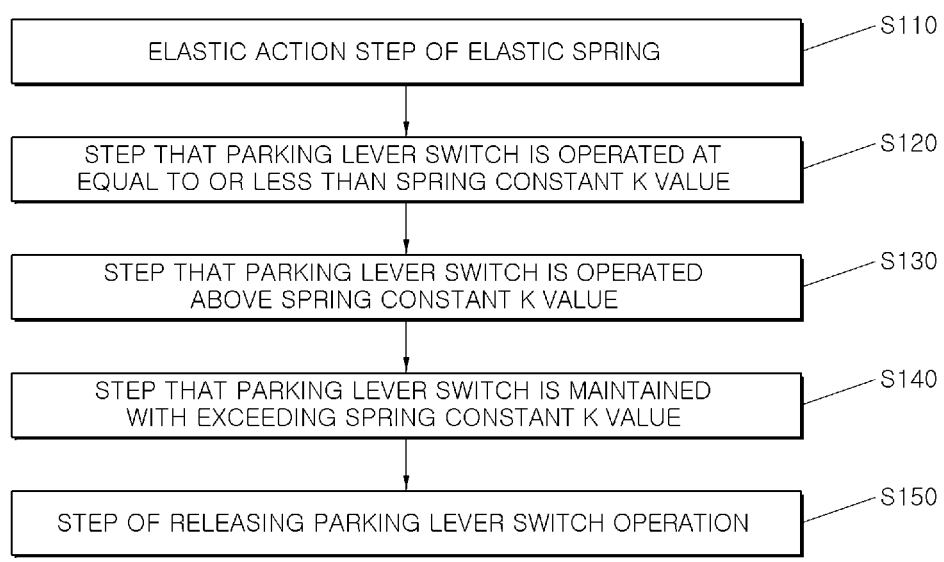
FIG. 4 is a flow chart showing an operation method of the parking lever switch according to an embodiment of the present disclosure.

FIG. 3 is a schematic view showing an operation relationship of the parking lever switch according to an embodiment of the present disclosure. FIG. 4 is a flow chart showing an operation method of the parking lever switch according to an embodiment of the present disclosure.

The operation relationship and operation method of the parking lever switch 1000 according to an embodiment of the present disclosure is explained by referring to FIGS. 3 and 4 together with FIGS. 1 and 2. The parking lever switch 1000 is configured to include the spring supporter 100, the switch input and output terminal 200 that contacts the spring supporter 100, the elastic spring 300 that supports the spring supporter 100, the cable rod 400 connected with the spring supporter 100, and the cable guide 500 that guides the cable rod 400. A series of examples in which the force to actuate the parking lever switch 1000 is applied are sequentially described. First, the operating method of the parking lever switch 1000 is as follows. The elasticity of the elastic spring 300 is applied to the spring supporter 100, which is connected to the cable rod 400, before the parking lever switch 1000 is operated [S110]. In this case, the switch output value is OFF.

The force applied to the spring supporter 100 connected with the cable rod 400 of the parking lever switch 1000 is equal to or less than the value obtained by multiplying the spring constant k by the displacement [S120], which is the case that the elastic spring supporting portion 120 of the spring supporter 100 does not contact the switch input and output terminal 200. Since the force applied to the spring supporter 100 connected with the cable rod 400 is equal to or less than the value obtained by multiplying the spring constant k by the displacement, the elastic spring 300 is not compressed and the switch output value through switch input and output wiring 210 of the switch input and output terminal 200 is OFF.

Subsequently, when the force applied to the spring supporter 100 connected with the cable rod 400 of the parking lever switch 1000 exceeds the value obtained by multiplying the spring constant k by the displacement [S130], the elastic spring 300 is compressed and the elastic spring supporting portion 120 of the spring supporter 100 contacts, at portion B, the bent extension portion 220 of the switch input and output terminal 200. At this point, the switch ON signal is output through the switch input and output wiring 210 of the switch input and output terminal 200.

The force applied to the spring supporter 100 connected with the cable rod 400 of the parking lever switch 1000 exceeding the value obtained by multiplying spring constant k by the displacement may continue to be maintained [S140]. When this occurs, the elastic spring 300 is compressed and the insertion supporting portion 130 of the spring supporter 100 is supported by the cable guide rod hole 510 of the cable guide 500, to be contacted with the elastic spring supporting portion 120 of the spring supporter 100, the bent extension portion 220 of the switch input and output terminal 200, and the portion corresponding to the insertion supporting portion 130 of the spring supporter 100 and the cable guide rod hole 510 of the switch input and output terminal 200, that is, a plurality of contact points at the portion B. At this time, the elastic spring 300 is compressed but the elastic spring 300 will not be further compressed when the insertion supporting portion 130 is supported by the cable guide rod hole 510. At this time, the switch ON signal is output through the switch input and output wiring 210 of the switch input and output terminal 200.

Herein, when the force applied to the spring supporter 100 connected with the cable rod 400 of the parking lever switch 1000 is released [S150], the elastic spring 300 releases the connection of the spring supporter 100 and the switch input and output terminal 200. At this time, the switch OFF signal will be output.

In the operation method, the cable rod 400 is guided along the cable guide rod hole 510 of the cable guide 500.

Therefore, the parking lever switch and operating method thereof according to the present disclosure are able to confirm that the parking lever is transmitting the operating force to the parking cable by a predetermined operating force or more, thereby improving reliability and safety in developing a remote start function of a manual transmission vehicle.

Further, compared with conventional electronic switches, the disclosed parking lever switch can reduce costs and minimize variations, so that information about the parking lever operating force can be sent out to improve commercial value and merchantability.

Those of ordinary skill in the art to which the present disclosure is directed may understand that the present disclosure may be made in other specific forms without changing the technical ideas or essential features thereof. Therefore, it should be understood that the above-described embodiments are merely presented by way of examples among various possible embodiments in order to help those having ordinary skill in the art understand. The technical ideas of the present disclosure are not limited or restricted only by the presented embodiments. Various changes, additions, and modifications may be made without departing from the technical idea of the present disclosure and other equivalent embodiments are possible. The scope of the present disclosure is set forth in the following claims rather than in the detailed description, and it should be interpreted that all changes and modifications that come within the meaning and range of equivalency of the claims and the equivalents thereof are included within the scope of the present disclosure. In addition, the applicants have defined terms or words used in the present specification and claims based on the principle that the applicants can properly define the concept of the term in order to explain its disclosure in the best way, and should not be construed to be limited to ordinary or dictionary meanings. Additionally, the order of configuration described in the above procedure does not necessarily have to be performed in the described order. This process can be included in the scope of the present disclosure if the gist of the present disclosure is satisfied even if the order of execution of each configuration and step is changed

What is claimed is:

1. A parking lever switch comprising;
  a spring supporter;
  a switch input and output terminal configured to contact the spring supporter;
  an elastic spring supporting the spring supporter;
  a cable rod connected with the spring supporter; and
  a cable guide formed with a cable guide rod hole and guiding the cable rod,
  wherein the parking lever switch is energized when the force applied to the spring supporter connected with the cable rod is equal to or greater than a value obtained by multiplying a spring constant k of the elastic spring by a displacement, and
  wherein the spring supporter includes a cable rod fixing portion, an elastic spring supporting portion supporting the elastic spring and configured to selectively contact the switch input and output terminal based on the force applied to the spring supporter, and an insertion supporting portion separated from the cable guide rod hole and configured to be inserted into and supported by the cable guide rod hole to contact the elastic spring supporting portion and a portion of the switch input and output terminal when the force is applied to the spring supporter.

2. The parking lever switch of claim 1, wherein the insertion supporting portion is formed with a wedge shape in the direction of the switch input and output terminal.

3. The parking lever switch of claim 1, wherein the switch input and output terminal comprises a switch input and output wiring configured to output a signal.

4. The parking lever switch of claim 1, wherein the switch input and output terminal is formed with a bent extension portion configured to contact the elastic spring supporting portion of the spring supporter.

5. The parking lever switch of claim 1, wherein the elastic spring provides elasticity between the spring supporter and the switch input and output terminal.

6. The parking lever switch of claim 1, wherein:

an end portion of the cable rod is fixed at the spring supporter; and another end portion of the cable rod is connected with an equalizer.

7. The parking lever switch of claim 6, wherein the equalizer is connected with a parking cable.

8. The parking lever switch of claim 1, wherein the cable guide is formed with a cable rod guide hole that guides the cable rod.

9. The parking lever switch of claim 8, wherein the cable rod guide hole is mounted at one side surface of a parking lever.

10. An operating method of a parking lever switch, the operating method comprising:

applying elasticity to a spring supporter connected with a cable rod by an elastic spring before a parking lever switch is operated;

applying a force to the spring supporter connected with the cable rod of the parking lever switch being operated that is equal to or less than a value obtained by multiplying a spring constant k by a displacement, whereby an OFF signal is output by the parking lever switch;

applying added force to the spring supporter connected with the cable rod of the parking lever switch being operated that exceeds the value obtained by multiplying the spring constant k by the displacement, whereby an ON signal is output by the parking lever switch;

maintaining the added force to the spring supporter connected with the cable rod of the parking lever switch being operated that exceeds the value obtained by multiplying the spring constant k by the displacement, whereby the ON signal is maintained by the parking lever switch; and releasing the force applied to the spring supporter connected with the cable rod of the parking lever switch, whereby the OFF signal is output by the parking lever switch, wherein the spring supporter includes cable rod fixing portion;

an elastic spring supporting portion supporting the elastic spring and configured to selectively contact the switch input and output terminal based on the force applied to the spring supporter; and an insertion supporting portion separated from the cable guide rod hole and configured to be inserted into and supported by the cable guide rod hole to contact the elastic spring supporting portion and a portion of the switch input and output terminal when the force is applied to the spring supporter.

11. The operating method of claim 10, wherein, when the force applied by the parking lever switch being operated is equal to or less than the value obtained by multiplying the spring constant k by the displacement, an elastic spring supporting portion of the spring supporter is not contacted with a switch input and output terminal.

12. The operating method of claim 10, wherein, when the force applied by the parking lever switch being operated exceeds the value obtained by multiplying the spring constant k by the displacement, an elastic spring supporting portion of the spring supporter is contacted with a bent extension portion of a switch input and output terminal.

13. The operating method of claim 10, wherein, when the force applied by the parking lever switch is maintained exceeding the value obtained by multiplying the spring constant k by the displacement, an insertion supporting portion of the spring supporter is supported by a cable guide rod hole of a cable guide.

14. The operating method of claim 10, wherein, when the force applied by the parking lever switch is released, the elastic spring releases the connection of the spring supporter and a switch input and output terminal.

15. The operating method of claim 10, wherein the cable rod is guided along a cable guide rod hole of a cable guide.

* * * * *